US00RE40474E

(19) United States
(12) Reissued Patent
Quellais et al.

(10) Patent Number: US RE40,474 E
(45) Date of Reissued Patent: Sep. 2, 2008

(54) MULTILAYER SOLE FOR SPORT SHOES

(75) Inventors: Jacques Quellais, Annecy Cedex 9 (FR); Francois Girard, Annecy Cedex 9 (FR)

(73) Assignee: Salomon S.A., Chavanod (FR)

(21) Appl. No.: 09/994,059

(22) Filed: Nov. 27, 2001

Related U.S. Patent Documents

Reissue of:
(64) Patent No.: 6,079,125
Issued: Jun. 27, 2000
Appl. No.: 08/319,096
Filed: Oct. 6, 1994

U.S. Applications:
(63) Continuation of application No. 07/995,083, filed on Dec. 22, 1992, now abandoned.

(30) Foreign Application Priority Data

Dec. 24, 1991 (FR) ..... 91 16275

(51) Int. Cl.
*A43B 13/00* (2006.01)
*A43B 13/12* (2006.01)

(52) U.S. Cl. ..... 36/25 R; 36/107; 36/114
(58) Field of Classification Search ..... 36/30 R, 36/107, 114, 108, 76 C, 28, 43, 44, 140, 91, 36/25 R, 27, 102, 29
See application file for complete search history.

(56) References Cited

U.S. PATENT DOCUMENTS 4,101,704 A * 7/1978 Hiles ..... 428/218
4,399,620 A * 8/1983 Funck ..... 36/30 R
4,651,445 A * 3/1987 Hannibal ..... 36/103
4,674,205 A * 6/1987 Anger ..... 36/44
4,694,591 A * 9/1987 Banich et al. ..... 36/102
4,723,364 A * 2/1988 Marxer ..... 36/10
4,757,620 A * 7/1988 Tiitola ..... 36/28
4,854,057 A * 8/1989 Misevich et al. ..... 36/114
4,878,300 A * 11/1989 Bogaty ..... 36/35 R
4,890,397 A * 1/1990 Harada et al. ..... 36/30 R
4,905,382 A * 3/1990 Yung-Mao ..... 36/28
5,014,706 A * 5/1991 Philipp ..... 36/140
5,042,174 A * 8/1991 Nichols ..... 36/25 R
5,052,130 A * 10/1991 Barry et al. ..... 36/107
5,084,987 A * 2/1992 Flemming ..... 36/28
5,185,943 A 2/1993 Tong et al.
5,191,727 A * 3/1993 Barry et al. ..... 36/107
5,720,118 A * 2/1998 Mayer et al. ..... 36/107

FOREIGN PATENT DOCUMENTS

| | | | |
|---|---|---|---|
| DE | 3723549 | * 11/1988 | |
| EP | 0 272 082 | 6/1988 | |
| EP | 0 329 391 | 8/1989 | |
| EP | 0 373 336 | 6/1990 | |
| EP | 0458174 | * 11/1991 | |
| FR | 2520986 | * 8/1983 | |
| FR | 2556569 | * 6/1985 | |
| WO | 9109547 | * 7/1991 | ..... 36/107 |

* cited by examiner

*Primary Examiner*—Marie Patterson
(74) *Attorney, Agent, or Firm*—Oblon, Spivak, McClelland, Maier & Neustadt, P.C.

(57) ABSTRACT

The sole comprises three layers, including (a) an outer or ground contact sole (7) having flexibility, ground-gripping, and abrasion-resistance properties, (b) an upper or comfort layer (8) positioned directly beneath the foot and having elastic shock-absorption properties, and (c) an intermediate layer or rib (9) positioned directly between the upper portion of the contact layer (7) and the lower portion of the comfort layer (8) and having torsional rigidity properties which provide both for the distribution of shocks sensed by the contact layer (7) and for their diffusion over the comfort layer (8) before they come into contact with the foot (4).

28 Claims, 6 Drawing Sheets

MULTILAYER SOLE FOR SPORT SHOES

Matter enclosed in heavy brackets [ ] appears in the original patent but forms no part of this reissue specification; matter printed in italics indicates the additions made by reissue.

This application is a continuation of application Ser. No. 07/995,083 filed Dec. 22, 1992, now abandoned.

OF THE INVENTION

The present invention relates to soles for sport shoes made with a laminated profile comprising multiple layers performing distinct functions, respectively. This sole is mounted on an upper and may or may not incorporate a projecting outer heel-piece in its rear portion.

BACKGROUND OF THE INVENTION

In shoes particularly intended for mountain sports, e.g., cross-country skiing, Nordic hiking, and mountain hiking in general, attempts have always been made to produce soles making it possible to obtain, simultaneously, torsional stiffness properties in relation to the longitudinal axis of the sole combined with good flectional properties, in particular in the area of the metatarsals.

This goal is sought most notably in cross-country skiing and Nordic hiking, where the boot cooperates with the ski and must provide optimal guidance of the latter.

Furthermore, longitudinal flexibility of the sole of the boot is indispensable so as to allow smooth extension of the foot not only during actual cross-country skiing or Nordic hiking, but also when the skis are removed, to permit walking freely.

The situation is the same for boots designed specifically for walking.

Moreover, and precisely in the case of walking shoes or ski boots designed to be used for walking, even of only occasionally, attempts have been made to produce soles having the aforementioned properties, but which can also provide a certain level of comfort and which damp the points of impact produced by contact of the boot with the ground, while restoring energy.

French Patent No. 2 520 886 relates to an athletic shoe comprising a laminated sole composed of a first layer, or contact sole, whose upper part receives a second, or inserted flexible layer, in a central plane of which a reinforcement element is inserted in the area of the heel-piece and extending toward the arch.

In this case, the efficiency of the second, comfort layer is impaired because of the presence of the reinforcement element in its central plane.

Moreover, the presence of a lower portion of the insert positioned between the reinforcement element and the contact sole increases proportionally the height and weight of the assembly.

In addition, currently-marketed mountain boots include a model sold under the "HANWAG" label, which offers a sole composed of an outer contact sole on which are superposed, in succession, a shock-absorbing layer, then a very rigid assembly insole fitted with an anti-torsion insert.

Another boot, currently marketed under the tradename "ASOLO" differs basically in that the shock-absorption layer is confined to the heel area and is housed in a corresponding recess provided in the outer contact layer.

In these latter cases, the principal disadvantage lies in the fact that the rigid layer is in direct contact with the foot and imparts excessive flectional rigidity to the sole. Furthermore, shock waves are felt in more pronounced fashion by the foot.

In French Patent No. 2 556 569, applicants have also proposed a solution consisting of producing an outer sole by using at least two plastic materials having different mechanical properties and by applying the duplicate-molding technique.

In fact, this sole comprises a stiffening element, or shank, made of a rigid plastic material and elastically deformable, which incorporates an area of flection, at least in the metatarsal-phalangeal area, in the form of spaced transverse plates separated by bridges having a lesser thickness and on which a flexible plastic, elastically deformable material is added through a duplicate-molding process. The bridges comprise openings through which the flexible duplicate-molded material can penetrate and are designed to break while making the rigid plates separate from each other when the sole is first used, the bridges then being connected simply by the flexible plastic material.

This solution has proved to be costly, given the complexity of the mold made for that purpose and of the simultaneous-injection equipment used; furthermore, this solution offers no comfort layer.

What is sought is precisely the following:

- obtaining greater walking comfort which is not neutralized by a stiffener inadequately arranged in the sole;
- improving shock-absorption and ground-traction properties;
- reaching a compromise between the lightest sole possible and a sole offering optimal ground traction, abrasion resistance, and torsional stiffness properties, while remaining relatively supple when flexed.

This stiffness can not be achieved using soles made only of rubber, since they would have to be too thick and, consequently, too heavy. Moreover, it is difficult to control with precision the rigidity of a rubber sole, in particular in different directions.

In addition, for purposes of standardization and cost savings, a modularly-variable sole design is sought, which can be easily adapted at minimal cost to different uses and sports, i.e., mountain sports, golf, cycling, etc.

SUMMARY OF THE INVENTION

The present invention is intended to overcome the aforementioned disadvantages and to achieve the following results:

- produce a sole incorporating a modularly-variable design and exhibiting the sought-for properties of traction on the ground, abrasion resistance, and torsional and flectional rigidity, so as to fulfill the extreme segmentation requirements in high- and medium-altitude mountain hiking, or in skiing in general or any other sport;
- enhance performance by applying the following principles;
  - for a high-performance shoe, approximate a "barefoot" configuration;
  - the shoe must be as light as possible;
  - the shoe must allow natural foot motion;
  - the shoe must damp or distribute the impact points while restoring energy;
  - it must allow walking on all types of ground;
  - it must prevent traumas, i.e, by
    - not disturbing the natural movement of the foot;
    - not cutting off sensations generated by the ground;
    - not cutting off blood circulation;

restoring the pumping-action feeling during walking (blood circulation problem).

To these ends, the present invention concerns a sole for a sport shoe incorporating a laminated profile comprising several layers performing different functions respectively, this sole being surmounted by an upper and optionally comprising, an outer heel-piece on its rear portion.

It is characterized by the fact that it comprises at least three layers arranged in the following way:

an outer, or contact, layer with determinate properties of flexibility, gripping, and abrasion-resistance which allow, simultaneously, good foot extension, good ground traction, and a high level of resistance to wear;

an upper, or comfort, layer located directly beneath the foot, which exhibits elastic shock-absorption properties and which is assembled directly on a surface of the assembly insole of the boot upper, or by means of an assembly insole;

an intermediate layer or rib of the sole, arranged directly between the upper part of the contact layer, by one of its faces, and the lower part of the comfort layer, by its other face, and exhibiting controlled torsional and flectional rigidity, and which provides simultaneously for the distribution of the shock areas sensed by the contact layer and their diffusion over the comfort layer, before coming in contact with the foot.

This construction incorporating three distinct layers, each of which has one or more well-determined functions, provides a modularly-variable sole design in which the integral functions may be changed by modifying a single layer; this is of particular importance for the design and manufacture of these soles.

Moreover, placing the comfort layer directly between the foot and the "rib" layer prevents this rib layer from interfering with comfort, and thus gives optimal comfort.

Finally, the effectiveness of the outer, or contact, layer is improved because the rib layer comes into contact and cooperates directly with this outer layer, the rib layer thus constituting, for the contact layer, a kind of framework which prevents generalized deformations of the contact layer, in the manner of the radial casing of an automobile tire, and allowing the user of softer, and thus more adherent, rubbers.

BRIEF DESCRIPTION OF THE DRAWINGS

The invention will be between understood and other features will be brought to light by virtue of the following description provided with reference to the attached drawings, wherein several embodiments of the invention are shown by way of example, and wherein.

DESCRIPTION OF THE PREFERRED EMBODIMENT

Figure 1:
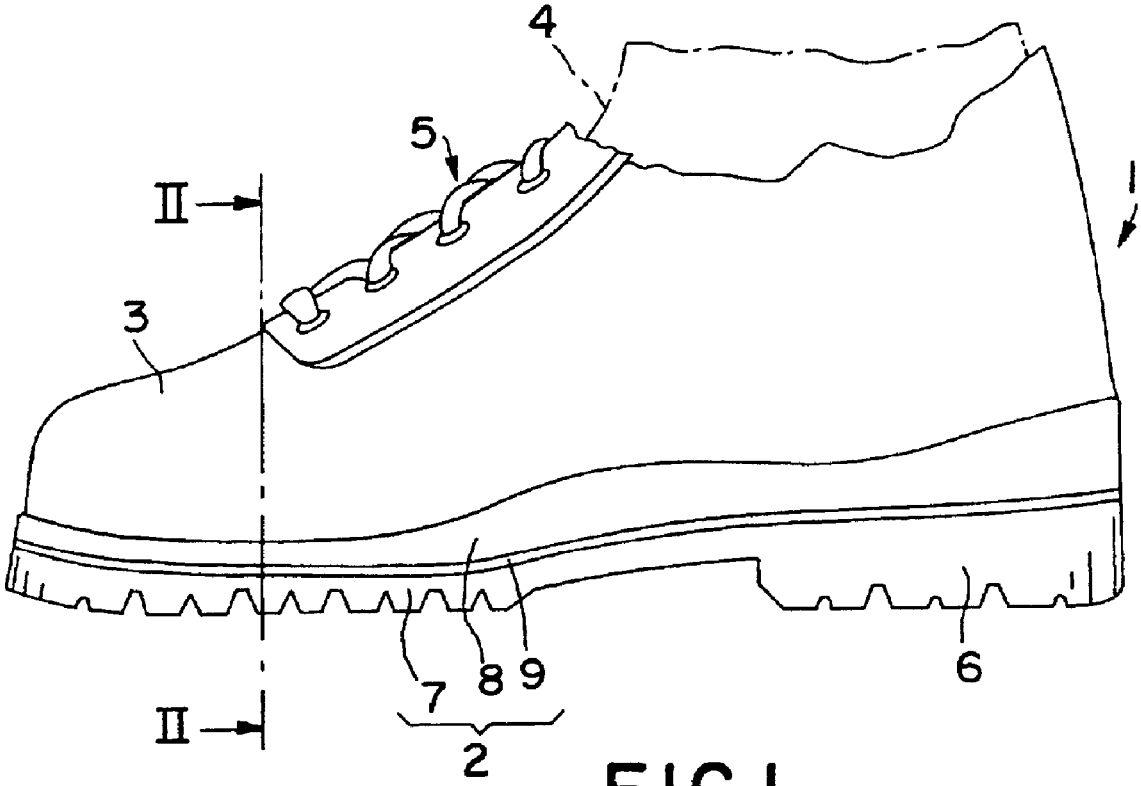
FIG. 1 is a side view of a sport shoe fitted with a sole according to the invention.
Figure 2:
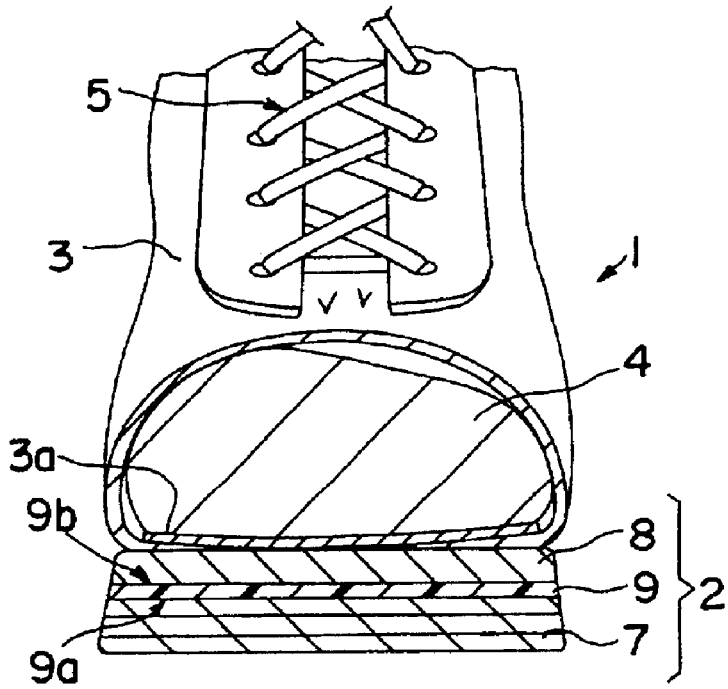
FIG. 2 is a transverse cross-section of the shoe along line II—II in FIG. 1.

The sport shoe 1 shown in a first embodiment in FIGS. 1 and 2 comprises an outer sole 2, on which an upper 3 is mounted, this upper incorporating conventionally an opening allowing insertion of the foot 4, this opening being fitted with a closure system 5, e.g., a lacing system. The rear part of the sole 2 comprises a heel 6.

The sole 2 has a laminated profile, as shown in FIG. 2, comprising several layers fulfilling distinct functions.

According to the invention and to the present embodiment, the sole 2 comprises three layers 7, 8, 9 arranged in the following manner:

an outer, or contact, layer 7 with properties of flexibility, gripping, and abrasion-resistance which allow, simultaneously, good foot extension, good ground traction, and a high level of resistance to wear;

an upper or comfort layer 8 placed directly beneath the upper, 3, and thus the foot 4, which has elastic shock-absorption properties and which is assembled directly on a surface of the assembly insole 3a of the upper 3 of the boot 1, or by means of an assembly insole (not shown);

an intermediate layer or rib 9 of the sole 2, arranged directly between the upper part of the contact layer 7, by means of one of its faces 9a, and the lower part of the comfort layer 8, by means of its other face 9b. This layer 9 exhibits controlled torsional and flectional rigidity, assuring both distribution of the shock areas sensed by the contact layer 7 and their diffusion over the comfort layer, before contact with the foot 4.

The comfort layer is made either of a flexible material of uniform density, or a material whose density gradually increases from its upper to its lower part, which is in contact with the rigid intermediate rib 9.

Figure 3:
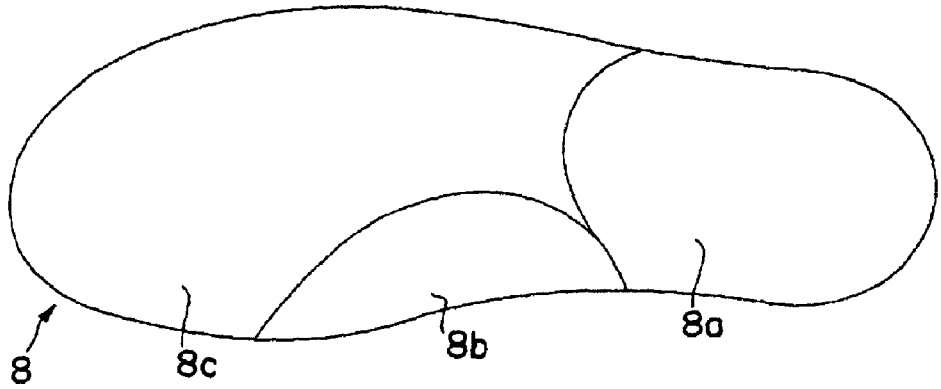
FIGS. 3 and 4 are top and side views, respectively, of an embodiment of an upper comfort layer designed to be mounted in combination with an intermediate rigid, or rib, layer and a low ground-contact layer (not shown), so as to form the sole according to the invention.
Figure 4:
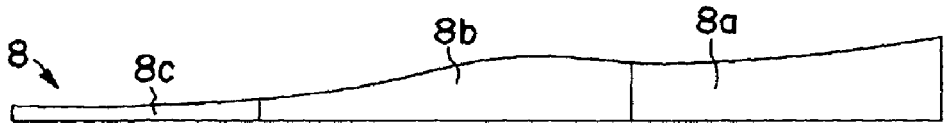

In the embodiment illustrated in FIGS. 3 and 4, the comfort layer 8 is composed of several distinct, adjoining zones, namely a first, highly-elastic zone 8a corresponding to the heel, a second zone 8b of medium elasticity corresponding to the arch and stimulating blood flow, and a third zone 8c of low elasticity controlling walking.

Figure 5:
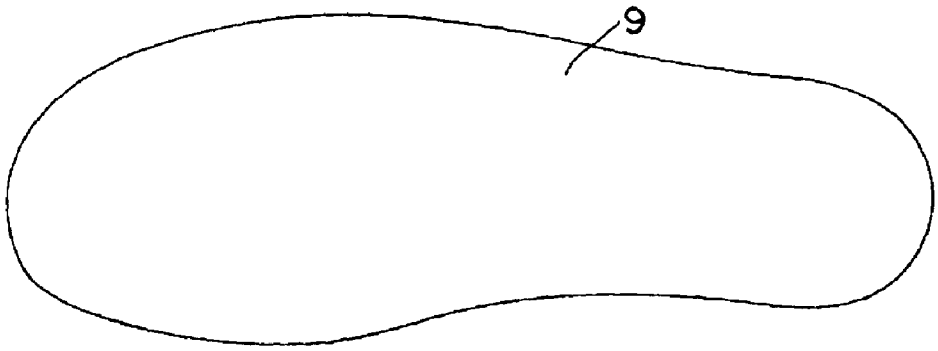
FIGS. 5 and 6 illustrate, respectively, two embodiments of intermediate rigid, or rib, layers.

According to one embodiment, in particular under torsion, the rigidity of the intermediate layer, or rib, 9 has a uniform value at all points, this value being suitably selected during manufacture as a function of the intended use of the shoe (FIG. 5).

This layer 9 can also be constituted by a rib 9A composed of a plurality of zones 9a, 9b, 9c extending on either side of an axis of torsion X–X' and having different stiffness values suitably selected during manufacture as a function of the intended use of the shoe.

Figure 6:
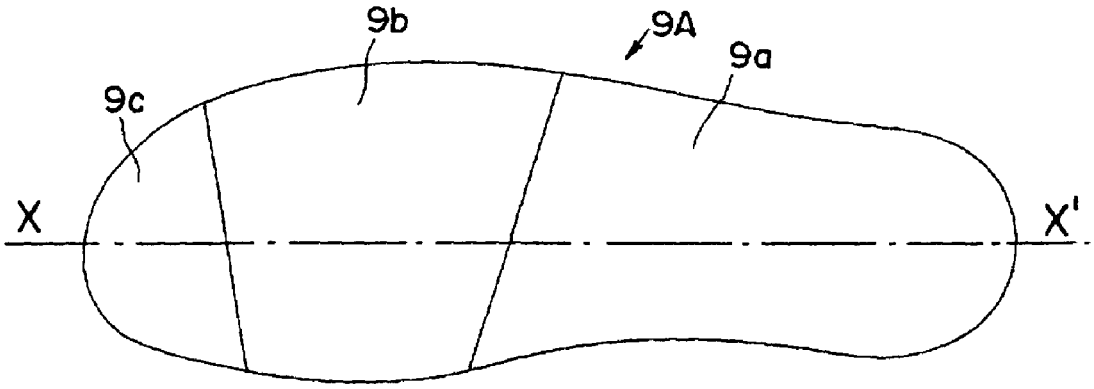

For example, in shoes designed especially for high mountain walking (FIG. 6), the rib 9A may be constituted by a rigid rear zone 9a, an intermediate semi-rigid zone 9b capable of promoting flection in the area of the metatarsals in the foot 4, and a rigid front zone 9c in the phalangeal area.

For shoes especially designed for walking in medium mountain altitudes (FIG. 6), the rib 9A may be constituted by a rigid rear zone 9a, a flexible intermediate zone 9b more broadly promoting flection in the area of the metatarsals in the foot 4 and extension of the foot, and a rigid front zone 9c in the phalangeal area.

The rib layer 9 may also be made of a composite material having different rigidity/flectional characteristics along different axes and exhibiting both, a high degree of stiffness under torsion (in a direction perpendicular to the axis X–X') and a degree of flexibility under torsion along axis X–X'.

Figure 7:
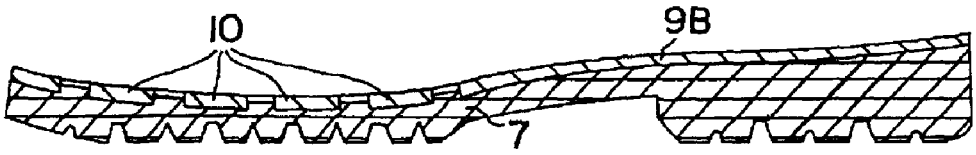
FIGS. 7 and 8 are longitudinal cross-section and top views, respectively, of an embodiment of a contact layer and of a rigid, or rib, layer (the comfort layer is not shown)
Figure 8:
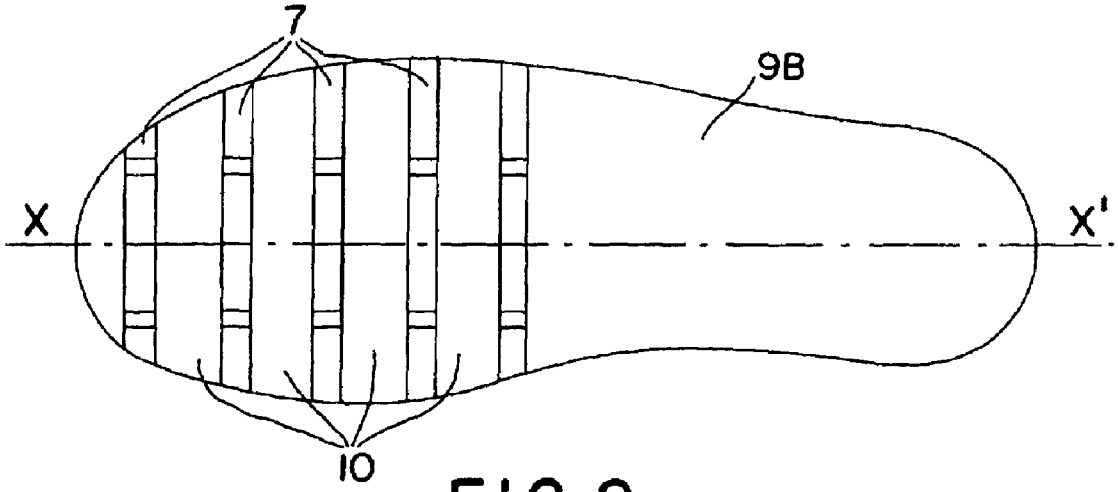

In the embodiment shown in FIGS. 7 and 8 (in which the comfort layer 8 is omitted), the intermediate rigid layer or rib 9B is constituted, at least in the metatarsal area, by a succession of rigid inserts 10 arranged in alternating fashion perpendicularly to the axis of torsion X–X' of the sole, so as to obtain good flexibility under flection while preserving an effective level of stiffness under torsion. These inserts 10 can be produced in the same molding operation as that used for the rest of the rib layer 9B.

The inserts 10 forming the rib 9B are preferably made during a single molding operation used to mold this layer 9B with the contact layer 7.

Figure 9:
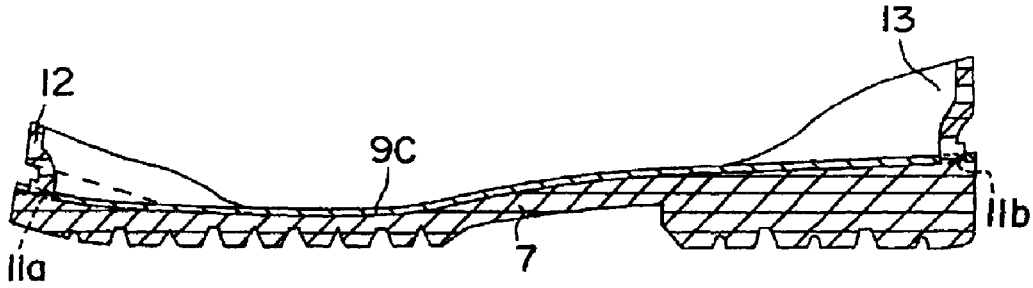
FIGS. 9, 10, and 11 show, in longitudinal cross-section, top view, and longitudinal cross-section, respectively, two embodiments of a rigid intermediate layer and a contact layer obtained by duplicate molding (the comfort layer is not illustrated)
Figure 10:
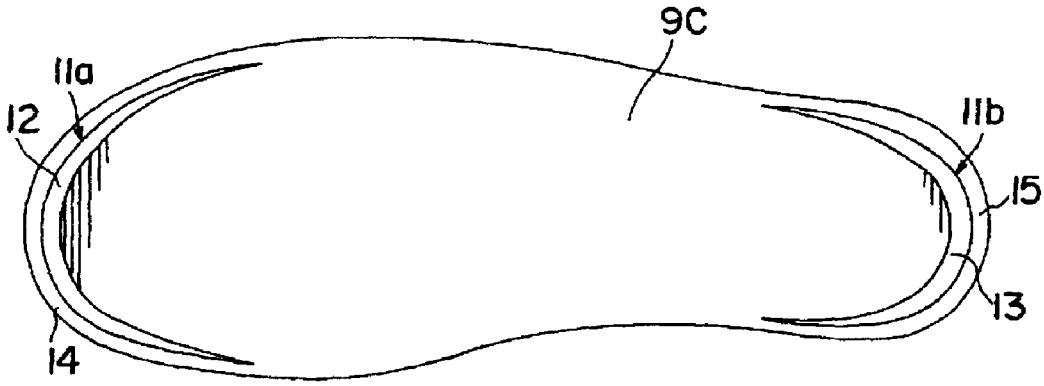

In the embodiment illustrated in FIGS. 9 and 10, the intermediate layer, or rib, 9C comprises, near its front and rear portions, two arcuate recesses 11a, 11b substantially corresponding to the ends of the sole and capable of allowing the passage of two stops 12, 13 projecting from the contact layer 7 and having inner surfaces to which portions of the upper 3 are adhesively bonded.

Figure 11:
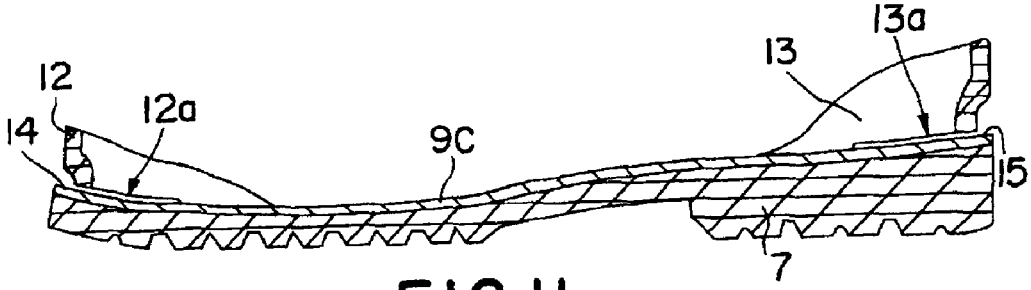

This latter solution offers the advantage that a shoulder 14, 15 perpendicular to the outer surfaces of the stops 12, 13 remains between the latter and the upper plane of the rib 9C, so as to obtain an attachment surface designed for the installation of ice studs in a high mountain boot. In the variant illustrated in FIG. 11, the stops 12, 13 are also formed from the contact layer 7, but it is these stops which have recesses 12a, 13a, respectively, to allow passage of the rib layer 9c, which thus comprises no recess.

Figure 12:
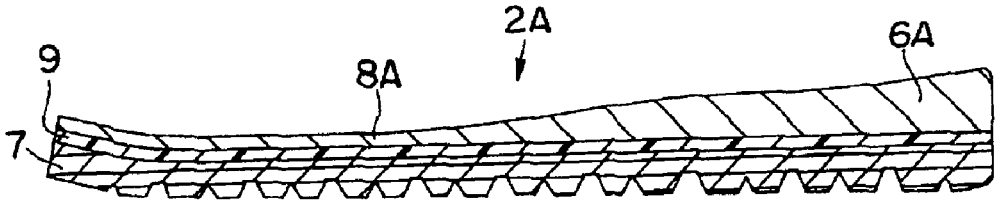
FIG. 12 is a longitudinal cross-section of a complete sole with a special embodiment of the heel-piece.

The variant shown in FIG. 12 a sole 2A in which the rear portion of the comfort layer BA comprises a balanced heel-portion 6A unitary with layer 8A, and which replaces the external heel 6 in the boot 1. Accordingly, the contact layer 7 has a substantially uniform thickness over its entire length.

Figure 15:
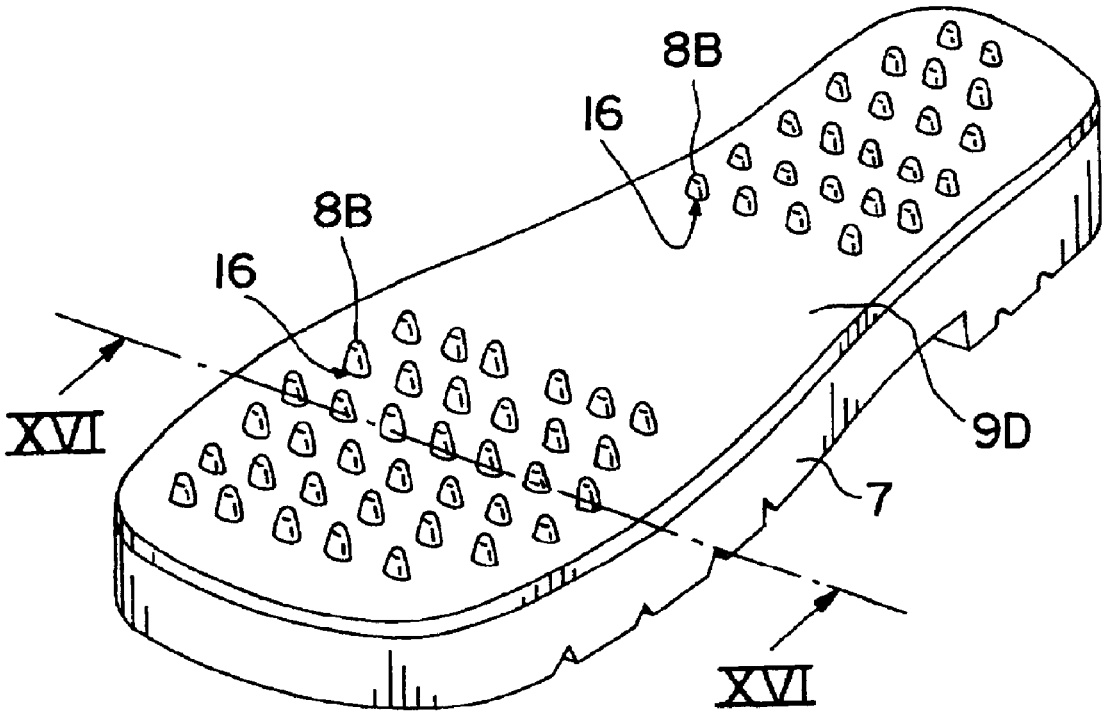
FIGS. 15 and 16 illustrate, in perspective and in transverse cross-section along line XVI—XVI, respectively, a triple-layer sole made from two materials, according to a special embodiment.
Figure 16:
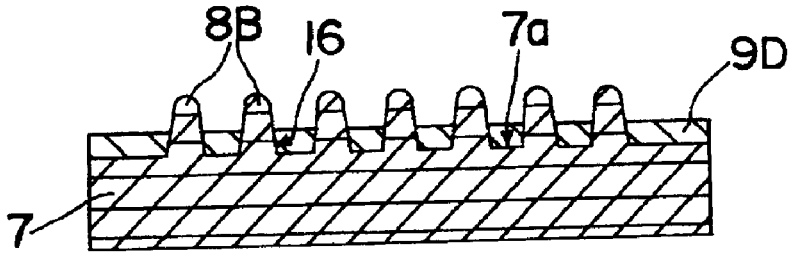

According to another variant, shown in FIGS. 15 and 16, the comfort layer is constituted by raised projections 8B made from the material on the upper portion 7a of the contact layer 7, whose shape corresponds to recesses 16 in the intermediate layer, or rib 9D, which they traverse and clear by an amount equal to the thickness of the comfort layer to be produced. The layer 9D can also be simply duplicate-molded on the contact layer 7 which incorporates these projections.

In the example shown, the projections 8B are constituted by points uniformly spaced in the area of the metatarsals and the heel. Of course, they could cover the entire surface of the foot.

The advantage of this solution is that it can produce a triple-layer sole according to the invention using two materials only, the flexibility of the comfort layer 8A to be obtained being a function of the density and/or the geometry of the points which constitute it.

Figure 13:
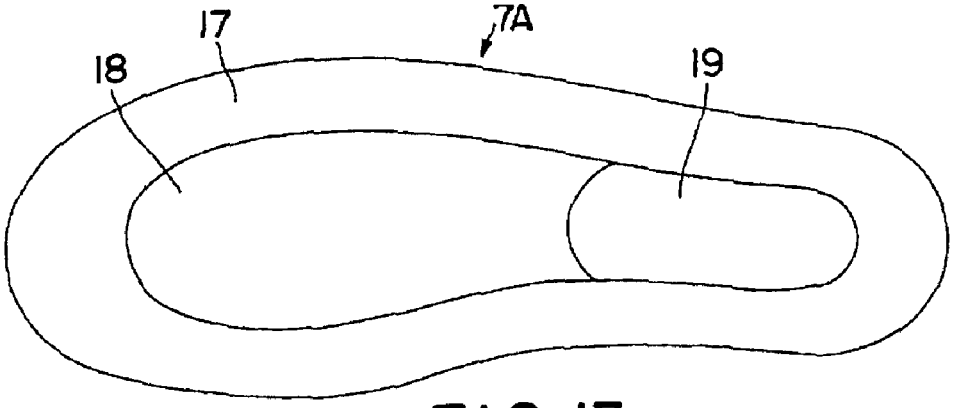
FIG. 13 is a schematic bottom plan view of a special embodiment of a ground-contact layer.

FIG. 13 illustrates a contact layer 7A constituted by a plurality of zones, including a first peripheral zone 17 corresponding to a principal mechanical ground-gripping zone, a second central front zone 18 corresponding to a secondary gripping or position-maintenance zone, and a third central rear neutral zone 19.

During walking, the first contact with the ground occurs principally on the periphery 17 of the sole. This periphery is thus carefully designed for maximum wear resistance and in order not to pick up dirt, so as to preserve its gripping properties.

Figure 14:
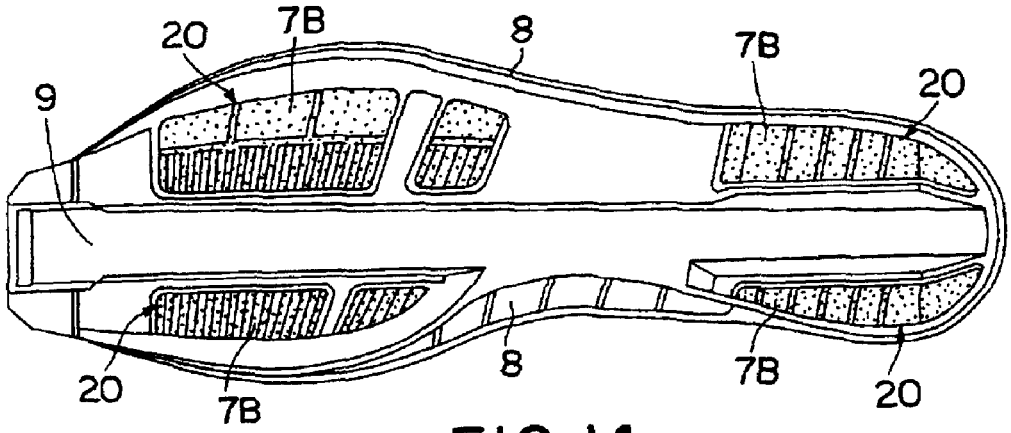
FIG. 14 is a bottom plan view of another embodiment of a ground-contact layer.

According to a variant illustrated in FIG. 14, the contact layer 7B is formed by skids mounted externally on the rib 9 in recesses 20 provided for that purpose in the latter, and whose depth is less than that of the skids themselves.

Skids 7B are preferably arranged on either side of the longitudinal torsion axis, in this particular instance on either side of a central groove in a cross-country ski boot.

Figure 17:
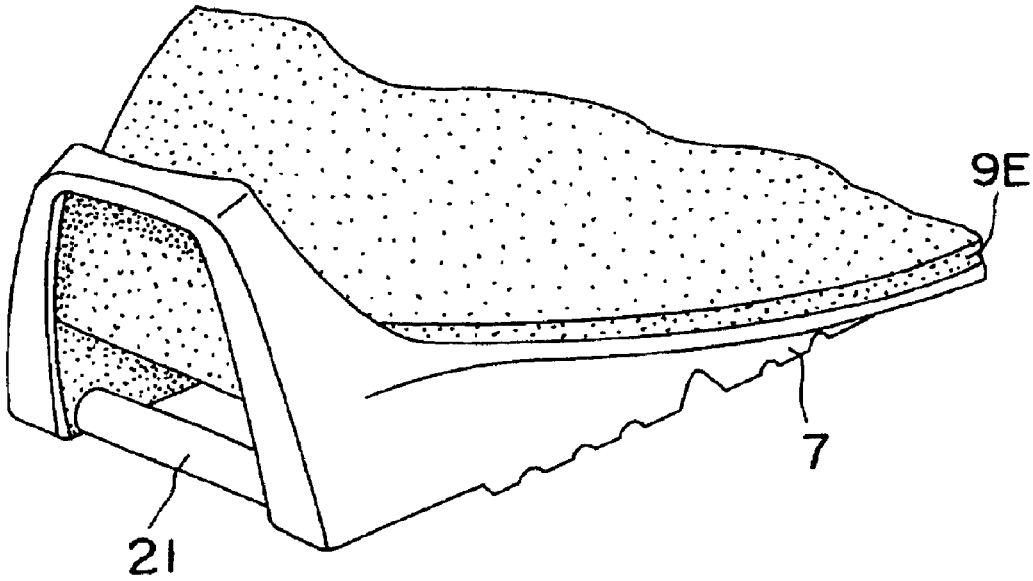
FIG. 17 is a partial perspective view of one end of a sole (comfort layer not shown), illustrating the incorporation of an insert in the intermediate rigid, or rib, layer.

In an application of the invention to cross-country ski or Nordic hiking boots (FIG. 17), the rigid intermediate layer 9E is used for the mechanical attachments of an attachment loop 21 designed to cooperate with a hinge-type binding optionally comprising an internal metal reinforcement insert, this insert and/or this loop 21 being duplicate molded in rigid intermediate layer 9E, such as that described in French Patent No. 91 04126 filed by Applicant. Of course, the rigid layer can be used for any other type of mechanical attachment of an interface.

For example, the rigid intermediate layer or rib 9 may be used for mechanical attachment of a metal insert cooperating with the binding of a pedal in a cycling application, the insert being duplicate molded in intermediate layer 9.

Figure 18:
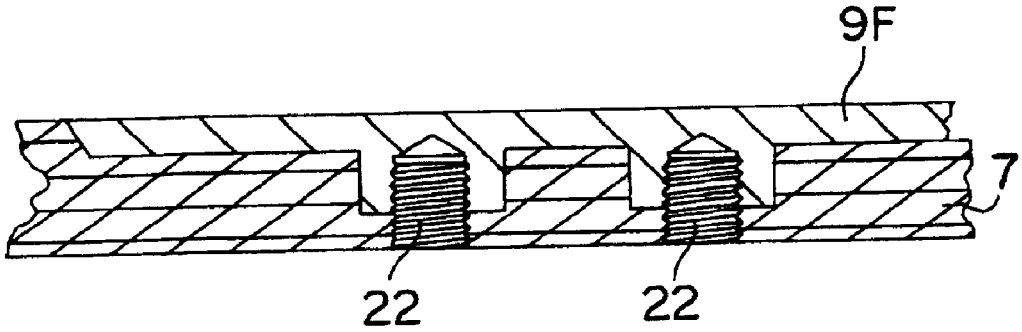
FIG. 18 is a partial representation of a longitudinal cross-section of a sole showing the incorporation of studs in the intermediate rigid, or rib, layer (comfort layer not shown).

In an application of the invention to golf shoes (FIG. 18), the lower part of rigid intermediate layer is provided with threaded holes 22 or rib 9F for the mechanical attachment of studs (not shown) in a screwed-in configuration.

The hardnesses of the different layers forming the sole are preferably as follows:

- the intermediate layer or rib 9, 9A, 9B, 9C, 9D, 9E, 9F has a hardness of more than 45 Shore D;
- the ground-contact layer 7, 7A, 7B has a hardness of less than 45 Shore D;
- the comfort layer 8, 8A, 8B has a hardness of less than 80 shore A.

In addition, according to a preferred embodiment of the invention, the ground-contact layer 7, 7A, 7B is made of rubber with gripping and abrasion-resistance properties.

However, this does not exclude a ground-contact layer 7, 7A, 7B also made of a polyurethane or any other thermoplastic material.

The rigid intermediate layer or rib 9, 9A, 9B, 9C, 9D, 9E, 9F may be made of filled or unfilled polyurethane (glass or carbon fibers, etc.), filled or unfilled polyamide, by a filled or unfilled polyethylene, or any other thermoplastic material.

It should also be noted that each of the layers 7, 8, 9 of the sole 2 may or may not extend over the entire surface of the sole (see, for example, the FIGS. 14 and 15 embodiment).

Finally, the layers 7, 8, 9 constituting the sole 2 may be connected by any means, such as adhesive bonding, duplicate molding, or ultrasound.

What is claimed is:

1. In a sport shoe comprising an upper, a sole made from a laminated profile comprising several layers performing distinct functions, respectively, said sole being surmounted by said upper, wherein said sole comprises at least three layers external to said upper, namely:

(a) a ground contact layer with determinate properties of flexibility, gripping and abrasion-resistance which provide good foot extension, good ground traction and a high level of wear resistance;

(b) an upper comfort layer located directly beneath the foot, said upper comfort layer having elastic shock-absorption properties and being assembled on said upper of said shoe; and (c) an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over an entire surface of said ground contact layer and constituting a framework for the ground contact layer preventing deformation of the ground contact layer and thereby permitting it to be made of softer, more adherent rubber, *wherein said ground contact layer, said upper comfort layer and said intermediate layer are substantially congruous with one another*.

[2. Sole according to claim 1, wherein said ground contact layer, said upper comfort layer and said intermediate layer are substantially congruous with one another.]

3. [Sole according to claim 1] *In a sport shoe comprising an upper, a sole made from a laminated profile comprising several layers performing distinct functions, respectively, said sole being surmounted by said upper, wherein said sole comprises at least three layers external to said upper, namely:*

*(a) a ground contact layer with determinate properties of flexibility, gripping and abrasion-resistance which provide good foot extension, good ground traction and a high level of wear resistance;*

*(b) an upper comfort layer located directly beneath the foot, said upper comfort layer having elastic shock-absorption properties and being assembled on said upper of said shoe; and*

*(c) an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over an entire surface of said ground contact layer and constituting a framework for the ground contact layer preventing deformation of the ground contact layer and thereby permitting it to be made of softer, more adherent rubber*, wherein said comfort layer is composed of several distinct adjoining zones, said zones including a first zone corresponding to the heel and having a first degree of elasticity; a second zone corresponding to the arch and having a degree of elasticity less than said first zone; and a third zone having a degree of elasticity less than said second zone and promoting control of walking.

4. [Sole according to claim 1] *In a sport shoe comprising an upper, a sole made from a laminated profile comprising several layers performing distinct functions, respectively, said sole being surmounted by said upper, wherein said sole comprises at least three layers external to said upper, namely:*

*(a) a ground contact layer with determinate properties of flexibility, gripping and abrasion-resistance which provide good foot extension, good ground traction and a high level of wear resistance;*

*(b) an upper comfort layer located directly beneath the foot, said upper comfort layer having elastic shock-absorption properties and being assembled on said upper of said shoe; and*

*(c) an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over an entire surface of said ground contact layer and constituting a framework for the ground contact layer preventing deformation of the ground contact layer and thereby permitting it to be made of softer, more adherent rubber*, wherein said intermediate layer has a substantially constant rigidity at all points, said rigidity being selected during manufacture as a function of intended use of the shoe.

5. Sole according to claim 1, wherein said intermediate layer has a hardness greater than 45 Shore D.

6. Sole according to claim 1, wherein said ground contact layer has a ha rd ness of less than 45 Shore D.

7. Sole according to claim 1, wherein said comfort layer has a hardness of less than 80 Shore A.

8. [Sole according to claim 1] *In a sport shoe comprising an upper, a sole made from a laminated profile comprising several layers performing distinct functions, respectively, said sole being surmounted by said upper, wherein said sole comprises at least three layers external to said upper, namely:*

*(a) a ground contact layer with determinate properties of flexibility, gripping and abrasion-resistance which provide good foot extension, good ground traction and a high level of wear resistance;*

*(b) an upper comfort layer located directly beneath the foot, said upper comfort layer having elastic shock-absorption properties and being assembled on said upper of said shoe; and*

*(c) an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over an entire surface of said ground contact layer and constituting a framework for the ground contact layer preventing deformation of the ground contact layer and thereby permitting it to be made of softer, more adherent rubber*, wherein said ground contact layer is made of rubber having traction and abrasion-resistance properties.

9. Sole according to claim 1, wherein said ground contact sole is made of a thermoplastic material.

10. Sole according to claim 3, wherein said intermediate layer is made of a material selected from the group consisting of filled and unfilled thermoplastic material.

11. Sole according to claim 1, wherein said layers constituting said sole are connected by adhesive bonding.

12. Sole according to claim 1, wherein said layers constituting said sole are connected by duplicate molding.

13. Sole according to claim 1, wherein said layers constituting said sole are connected by ultrasound.

14. [Sole according to claim 1] *In a sport shoe comprising an upper, a sole made from a laminated profile comprising several layers performing distinct functions, respectively, said sole being surmounted by said upper, wherein said sole comprises at least three layers external to said upper, namely:*

(*a*) *a ground contact layer with determinate properties of flexibility, gripping and abrasion-resistance which provide good foot extension, good ground traction and a high level of wear resistance;*

(*b*) *an upper comfort layer located directly beneath the foot, said upper comfort layer having elastic shock-absorption properties and being assembled on said upper of said shoe; and*

(*c*) *an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over an entire surface of said ground contact layer and constituting a framework for the ground contact layer preventing deformation of the ground contact layer and thereby permitting it to be made of softer, more adherent rubber*, wherein said intermediate layer[, or rib] (9A) is constituted by a plurality of zones (9a, 9b, 9c) extending on either side of an axis of torsion (X–x') whose stiffness values are different and suitably selected during manufacture as a function of the intended use of the shoe.

15. Sole according to claim 14, wherein, for shoes especially designed for high mountain walking, said rib (9A) is constituted by a rigid rear zone (9a), a semi-rigid intermediate zone (9b) promoting flection in the metatarsal area of the foot (4), and a rigid front zone (9c) in the phalangeal area.

16. Sole according to claim 14, wherein, for shoes especially designed for walking in medium mountain altitudes, said rib (9A) is constituted by a rigid rear zone (9a), a flexible intermediate zone (9b) promoting flection in the area of the metatarsals in the foot (4), and a rigid front zone (9c) in the phalangeal area.

[17. Sole according to claim 1, wherein said rigid intermediate layer, or rib (9B) is constituted, at least in the metatarsal area, by a succession of rigid inserts (10) arranged in alternating fashion perpendicularly to the axis of torsion (X–X') of said sole, so as to obtain good flexibility under flection while preserving good stiffness under torsion.]

[18. Sole according to claim 17, wherein said inserts (10) constituting said rib (9B) and said rib layer 9B are produced during a single molding operation.]

[19. Sole according to claim 1, wherein said intermediate layer, or rib (9C) comprises, in proximity to its front and rear portions, two arc-shaped recesses (11a, 11b) substantially corresponding to the ends of said sole and capable of allowing passage of two stops (12, 13) formed from said contact layer (7) and on the inner surfaces of which parts of the upper (3) are adhesively bonded.]

20. Sole according to claim 19, wherein a shoulder (14, 15) perpendicular to the outer surfaces of said stops (12, 13) remains between the latter and the plane of said rib (9C) so as to produce an attachment designed for installation of ice studs, in a high mountain boot.

21. [Sole according to claim 1] *In a sport shoe comprising an upper, a sole made from a laminated profile comprising several layers performing distinct functions, respectively, said sole being surmounted by said upper, wherein said sole comprises at least three layers external to said upper, namely:*

(*a*) *a ground contact layer with determinate properties of flexibility, gripping and abrasion-resistance which provide good foot extension, good ground traction and a high level of wear resistance;*

(*b*) *an upper comfort layer located directly beneath the foot, said upper comfort layer having elastic shock-absorption properties and being assembled on said upper of said shoe; and*

(*c*) *an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over an entire surface of said ground contact layer and constituting a framework for the ground contact layer preventing deformation of the ground contact layer and thereby permitting it to be made of softer, more adherent rubber*, wherein said comfort layer (8A) comprises, in its rear part, a balanced heel-piece (6A) produced as a single piece with said layer (8A) [and replacing the outer heel-piece (6) of said shoe (1)].

[22. Sole according to claim 1, wherein said ground-contact layer (7A) is constituted by a plurality of zones, including a first peripheral zone (17) corresponding to a principal mechanical ground-gripping zone, a second central front zone (18) corresponding to a secondary position-maintenance or gripping zone, and a third neutral central rear zone (19).]

23. [Sole according to claim 1] *In a sport shoe comprising an upper, a sole made from a laminated profile comprising several layers performing distinct functions, respectively, said sole being surmounted by said upper, wherein said sole comprises at least three layers external to said upper, namely:*

(*a*) *a ground contact layer with determinate properties of flexibility, gripping and abrasion-resistance which provide good foot extension, good ground traction and a high level of wear resistance;*

(*b*) *an upper comfort layer located directly beneath the foot, said upper comfort layer having elastic shock-absorption properties and being assembled on said upper of said shoe; and*

(*c*) *an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over an entire surface of said*

*ground contact layer and constituting a framework for the ground contact layer preventing deformation of the ground contact layer and thereby permitting it to be made of softer, more adherent rubber*, wherein said ground-contact layer (7B) is formed from skids mounted externally on said [rib] *intermediate layer* (9) in recesses (20) provided in the [latter] *intermediate layer* for that purpose.

[24. Sole according to claim 1, wherein said comfort zone is constituted by points (8b) made of the material on the upper part (7a) of said contact layer (7), and which pass through said intermediate layer, or rib (9D) and clear it by a value equal to the thickness of said comfort layer to be produced.]

25. Sole according to claim 1, wherein said rigid intermediate layer, or rib, (9E) allows mechanical attachment of a hinge-type binding loop (21) in an application to cross-country ski or Nordic hiking boots, comprising or not an inner metal strengthening insert, said insert and/or said loop (21) being duplicate molded in said rigid intermediate layer (9E).

26. Sole according to claim 1, wherein said rigid intermediate layer, or rib (9) can allow mechanical attachment of an insert cooperating with an associated binding for assembly of said sole to an element such as a ski, cycle pedal, etc., said insert being duplicate molded in said rigid intermediate layer 9).

27. Sole according to claim 21, wherein said intermediate layer, or rib (9F) can allow mechanical attachments of studs in a screw-in configuration in an application to golf shoes.

*28. In a sport shoe comprising an upper, a sole made from a laminated profile comprising several layers performing distinct functions, respectively, said sole being surmounted by said upper, wherein said sole comprises at least three layers external to said upper, namely:*

*(a) a ground contact layer with determinate properties of flexibility, gripping and abrasion-resistance which provide good foot extension, good ground traction and a high level of wear resistance;*

*(b) an upper comfort layer located directly beneath the foot, said upper comfort layer having elastic shock-absorption properties and being assembled on said upper of said shoe; and*

*(c) an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over substantially an entire surface of said ground contact layer and constituting a framework for the ground contact layer preventing deformation of the ground contact layer and thereby permitting it to be made of softer, more adherent rubber, wherein said ground contact layer, said upper comfort layer and said intermediate layer are substantially congruous with one another.*

*29. In a sport shoe comprising an upper, a sole made from a laminated profile comprising several layers performing distinct functions, respectively, said sole being surmounted by said upper, wherein said sole comprises at least three layers external to said upper, namely:*

*(a) a ground contact layer with determinate properties of flexibility, gripping and abrasion-resistance which provide good foot extension, good ground traction and a high level of wear resistance;*

*(b) an upper comfort layer located directly beneath the foot, said upper comfort layer having elastic shock-absorption properties and being assembled on said upper of said shoe; and*

*(c) an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over substantially an entire surface of said ground contact layer and constituting a framework for the ground contact layer preventing deformation of the ground contact layer and thereby permitting it to be made of softer, more adherent rubber, wherein said comfort layer is composed of several distinct adjoining zones, said zones including a first zone corresponding to the heel and having a first degree of elasticity; a second zone corresponding to the arch and having a degree of elasticity less than said first zone; and a third zone having a degree of elasticity less than said second zone and promoting control of walking.*

*30. In a sport shoe comprising an upper, a sole made from a laminated profile comprising several layers performing distinct functions, respectively, said sole being surmounted by said upper, wherein said sole comprises at least three layers external to said upper, namely:*

*(a) a ground contact layer with determinate properties of flexibility, gripping and abrasion-resistance which provide good foot extension, good ground traction and a high level of wear resistance;*

*(b) an upper comfort layer located directly beneath the foot, said upper comfort layer having elastic shock-absorption properties and being assembled on said upper of said shoe; and*

*(c) an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over substantially an entire surface of said ground contact layer and constituting a framework for the ground contact layer preventing deformation of the ground contact layer and thereby permitting it to be made of softer, more adherent rubber, wherein said intermediate layer has a substantially constant rigidity at all points, said rigidity being selected during manufacture as a function of intended use of the shoe.*

*31. In a sport shoe comprising an upper, a sole made from a laminated profile comprising several layers performing distinct functions, respectively, said sole being surmounted by said upper, wherein said sole comprises at least three layers external to said upper, namely:*

*(a) a ground contact layer with determinate properties of flexibility, gripping and abrasion-resistance which provide good foot extension, good ground traction and a high level of wear resistance;*

*(b) an upper comfort layer located directly beneath the foot, said upper comfort layer having elastic shock-absorption properties and being assembled on said upper of said shoe; and*

(*c*) *an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over substantially an entire surface of said ground contact layer and constituting a framework for the ground contact layer preventing deformation of the ground contact layer and thereby permitting it to be made of softer, more adherent rubber, wherein said ground contact layer is made of rubber having traction and abrasion-resistance properties.*

*32. In a sport shoe comprising an upper, a sole made from a laminated profile comprising several layers performing distinct functions, respectively, said sole being surmounted by said upper, wherein said sole comprises at least three layers external to said upper, namely:*

(*a*) *a ground contact layer with determinate properties of flexibility, gripping and abrasion-resistance which provide good foot extension, good ground traction and a high level of wear resistance;*

(*b*) *an upper comfort layer located directly beneath the foot, said upper comfort layer having elastic shock-absorption properties and being assembled on said upper of said shoe; and*

(*c*) *an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over substantially an entire surface of said ground contact layer and constituting a framework for the ground contact layer preventing deformation of the ground contact layer and thereby permitting it to be made of softer, more adherent rubber, wherein said intermediate layer (9A) is constituted by a plurality of zones (9a, 9b, 9c) extending on either side of an axis of torsion (X-x') whose stiffness values are different and suitably selected during manufacture as a function of the intended use of the shoe.*

*33. In a sport shoe comprising an upper, a sole made from a laminated profile comprising several layers performing distinct functions, respectively, said sole being surmounted by said upper, wherein said sole comprises at least three layers external to said upper, namely:*

(*a*) *a ground contact layer with determinate properties of flexibility, gripping and abrasion-resistance which provide good foot extension, good ground traction and a high level of wear resistance;*

(*b*) *an upper comfort layer located directly beneath the foot, said upper comfort layer having elastic shock-absorption properties and being assembled on said upper of said shoe; and*

(*c*) *an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over substantially an entire surface of said ground contact layer and constituting a framework for the ground contact layer preventing deformation of the ground contact layer and thereby permitting it to be made of softer, more adherent rubber, wherein said comfort layer (8A) comprises, in its rear part, a balanced heel-piece (6A) produced as a single piece with said layer (8A).*

*34. In a sport shoe comprising an upper, a sole made from a laminated profile comprising several layers performing distinct functions, respectively, said sole being surmounted by said upper, wherein said sole comprises at least three layers external to said upper, namely:*

(*a*) *a ground contact layer with determinate properties of flexibility, gripping and abrasion-resistance which provide good foot extension, good ground traction and a high level of wear resistance;*

(*b*) *an upper comfort layer located directly beneath the foot, said upper comfort layer having elastic shock-absorption properties and being assembled on said upper of said shoe; and*

(*c*) *an intermediate layer of said sole, arranged directly between an upper part of said ground contact layer, by one of its faces, and the lower part of said comfort layer by its other face, having controlled torsional and flectional rigidity, and providing both for the distribution of shockwaves and stresses sensed by said ground contact layer and for their diffusion over said comfort layer before coming in contact with the foot, said intermediate layer extending over substantially an entire surface of said ground contact layer and constituting a framework for the ground contact layer preventing deformation of the ground contact layer and thereby permitting it to be made of softer, more adherent rubber, wherein said ground-contact layer (7B) is formed from skids mounted externally on said intermediate layer (9) in recesses (20) provided in the intermediate layer for that purpose.*

* * * * *